United States Patent [19]

Merritt, III et al.

[11] Patent Number: 4,802,395
[45] Date of Patent: Feb. 7, 1989

[54] KNIFE ASSEMBLY FOR NET DISPENSING APPARATUS

[75] Inventors: John H. Merritt, III, New Holland; Paul S. Shenberger, Wyomissing, both of Pa.

[73] Assignee: Ford New Holland, Inc., New Holland, Pa.

[21] Appl. No.: 45,944

[22] Filed: May 1, 1987

[51] Int. Cl.$^4$ .................. B26D 7/00; A01D 39/00
[52] U.S. Cl. ........................... 83/649; 56/341
[58] Field of Search ............ 83/610, 611, 612, 597, 83/601, 649; 56/341, DIG. 17, DIG. 20

[56] References Cited

U.S. PATENT DOCUMENTS

| | | | |
|---|---|---|---|
| 3,998,120 | 12/1976 | Granger et al. | 83/649 |
| 4,407,113 | 10/1983 | Core | 56/341 |
| 4,409,784 | 10/1983 | VanGinhoven et al. | 56/341 |

*Primary Examiner*—Donald R. Schran
*Assistant Examiner*—Scott A. Smith

*Attorney, Agent, or Firm*—Larry W. Miller; Frank A. Seemar; Darrell F. Marquette

[57] ABSTRACT

A knife assembly for a net dispensing apparatus used on a round baler is disclosed wherein the knife assembly is moved into a cutting position engageable with the netting material without imparting impact energy into the netting material. The knife assembly includes a knife holder having a curved portion wrapped concentrically around a pivot shaft and a detachable knife member. When the knife assembly is moved into a cutting position, the netting material forms an angle around the cutting edge of the knife member with a portion of the netting material extending generally parallel to the plane of the plane of the knife member. The tension applied to the netting material by reason of the net dispenser feed roll being halted and the cylindrical bale continuing in rotation pulls the netting material across the cutting edge of the knife member to effect a severance thereof.

5 Claims, 6 Drawing Sheets

KNIFE ASSEMBLY FOR NET DISPENSING APPARATUS

BACKGROUND OF THE INVENTION

The present invention relates generally to round balers utilized for making a cylindrical bale of crop material and, more particularly, to a net dispensing device for selectively introducing netting material into the round baler's bale forming mechanism so that the finished bale can be wrapped with an outer layer of netting.

Net dispensing mechanisms for use in conjunction with round balers to wrap the exterior of a finished round bale with a layer of netting material is a relatively recent feature being incorporated into round balers. One such net dispensing device can be found on the Claas Model Rollant 44 round baler which utilizes a tray to physically hold a roll of netting material, the netting material being fed between a driven resilient feed roller and a rigid pinch roller by which means the netting can be fed into the bale chamber of the round baler for wrapping around a completed round bale therewithin. A more detailed description of this net dispensing device can be found with reference to the detailed description of FIG. 9 (prior art) below.

The aforementioned Claas round baler utilizes a pivoted braking device through which the netting material is threaded to backwrap the netting material and increase the tension thereon when cutting thereof is desired. The Claas round baler then utilizes a swinging knife mounted on a pivot arm to impart a relatively high amount of impact energy into the netting material to cause a severing thereof when the desired amount of netting material has been applied to the completed cylindrical bale. It has been found desirable to provide an interacting driving and cutting mechanism for applying the netting material to the completed cylindrical bale without providing additional mechanism through which the netting material must be threaded and for severing the netting material without imparting energy into the netting material to affect the severing thereof.

SUMMARY OF THE INVENTION

It is object of this invention to overcome the aforementioned disadvantages of the prior art by providing a pivoted knife assembly for use with a net dispensing apparatus for delivering netting material into the bale forming mechanism of a round baler.

It is another object of this invention to provide a cutting mechanism that does not impart impact energy into the netting material to affect a severance thereof.

It is still another object of this invention to provide a knife assembly that can be operably connected to the movement of the net dispenser drive mechanism for proper synchronization therebetween.

It is an advantage of this invention that the cutting knife is not moved into a cutting position until the feed roller drive has been declutched.

It is a feature of this invention that the severing of the netting material is accomplished by a pulling of the netting material into a knife rotated into a cutting position.

It is yet another object of this invention to provide a cutting mechanism operable to sever the netting material without imparting a high impact energy into the netting material.

It is a further advantage of this invention that actuation of the cutting knife into and out of a cutting position is accomplished by simply rotating a pivot shaft.

It is another feature of this invention that the cutting knife is rotated radially with respect to its pivot shaft.

It is yet another feature of this invention that the netting material forms an angle around the cutting edge of the knife when it is moved into a cutting position with a portion of the netting material extending substantially parallel to the plane of the cutting knife.

It is still a further object of this invention to provide a knife mechanism for a net dispensing device which is durable in construction, inexpensive of manufacture, carefree of maintenance, facile in assemblage, and simple and effective in use.

These and other objects, features, and advantages are accomplished according to the instant invention by providing a knife assembly for a net dispensing apparatus used on a round baler wherein the knife assembly is moved into a cutting position engageable with the netting material without imparting impact energy into the netting material. The knife assembly includes a knife holder having a curved portion wrapped concentrically around a pivot shaft and a detachabe knife member. When the knife assembly is moved into a cutting position, the netting material forms an angle around the cutting edge of the knife member with a portion of the netting material extending generally parallel to the plane of the plane of the knife member. The tension applied to the netting material by reason of the net dispenser feed roll being halted and the cylindrical bale continuing in rotation pulls the netting material across the cutting edge of the knife member to effect a severance thereof.

BRIEF DESCRIPTION OF THE DRAWINGS

The advantages of this invention will become apparent upon consideration of the following disclosure of this invention, especially when taken in conjunction with the accompanying drawings wherein.

DETAILED DESCRIPTION OF THE PREFERRED EMBODIMENT

Figure 9:
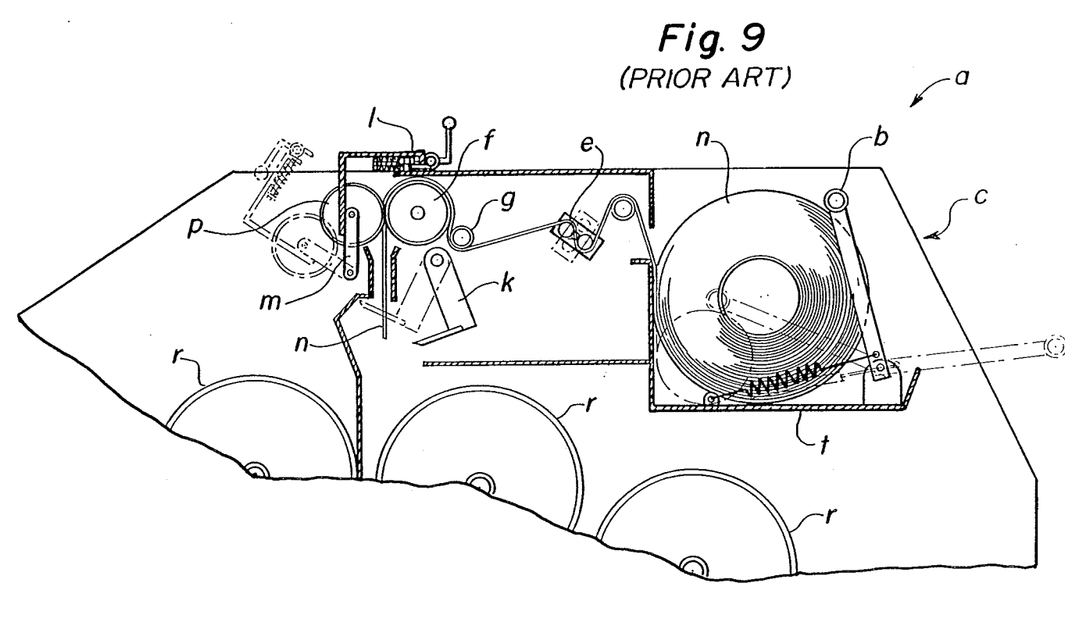
FIG. 9 is a schematic partial side elevational view of the net dispensing apparatus utilized on the Claas Model Rollant 44 round baler which is prior art to the instant invention.

Referring first to FIG. 9, the Claas prior art net dispensing apparatus referred to above will be described in greater detail. The round baler (a) is of the fixed chamber type with a plurality of rollers journalled between opposing side sheets to form a chamber therebetween in which the cylindrical bale is formed. The net dispensing apparatus (c) includes a tray (t) in which a roll of netting material (n) is disposed. A braking bar (b) held into position by an overcenter spring retains the roll of netting material (n) in position in the tray (t) as shown in phantom. The netting material is threaded through a pivotable braking apparatus (e), under a guide roller (g), around the feed roller (f), and between a pinch roller (e) and the feed roller (f). A swinging knife (k) is movable to engage the net between the feed roller (f) and the cylindrical bale to sever the net when a sufficient net has been wrapped around the bale. The pinch roller (p) is mounted on a pivoted arm (m) equipped with a latching mechanism (l) to fixedly secure the pinch roller (p) against and into engagement with the feed roller (f).

Figure 1:
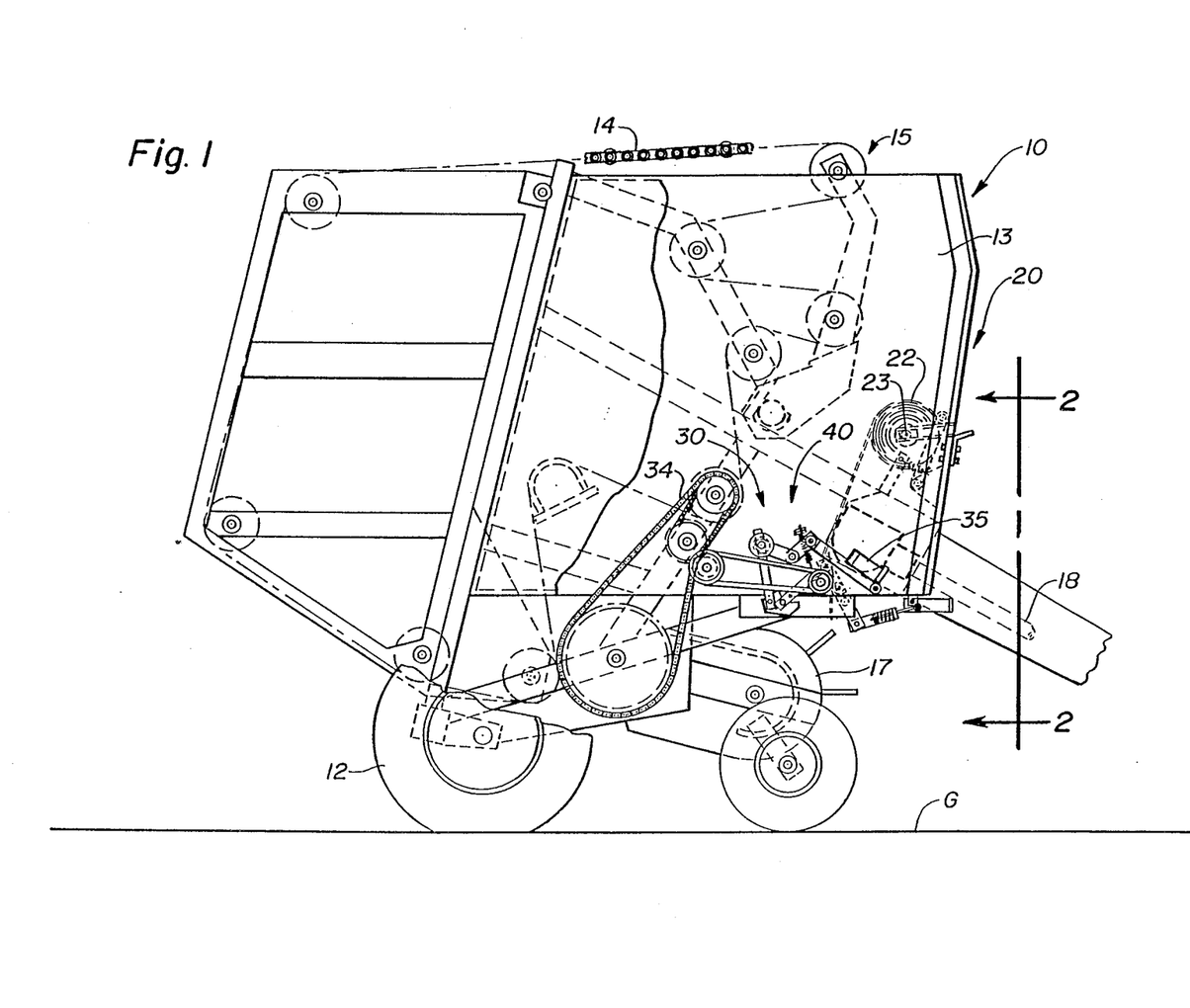
FIG. 1 is a side elevational view of a round baler incorporating the principles of the instant invention, portions of the round baler being broken away to better show the invention.
Figure 2:
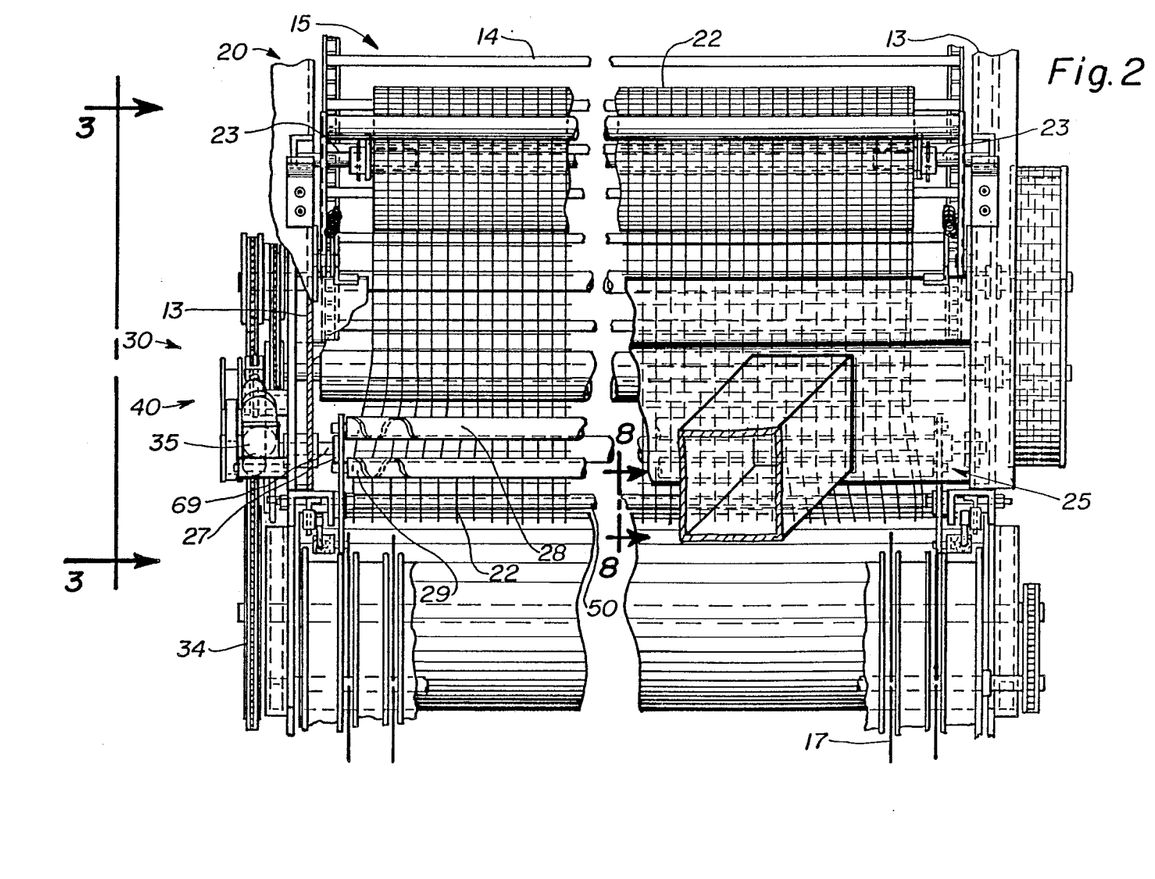
FIG. 2 is a partial front elevational view of the round baler corresponding to lines 2—2 of FIG. 1, portions of the central part of the round baler being broken away for purposes of clarity.
Figure 3:
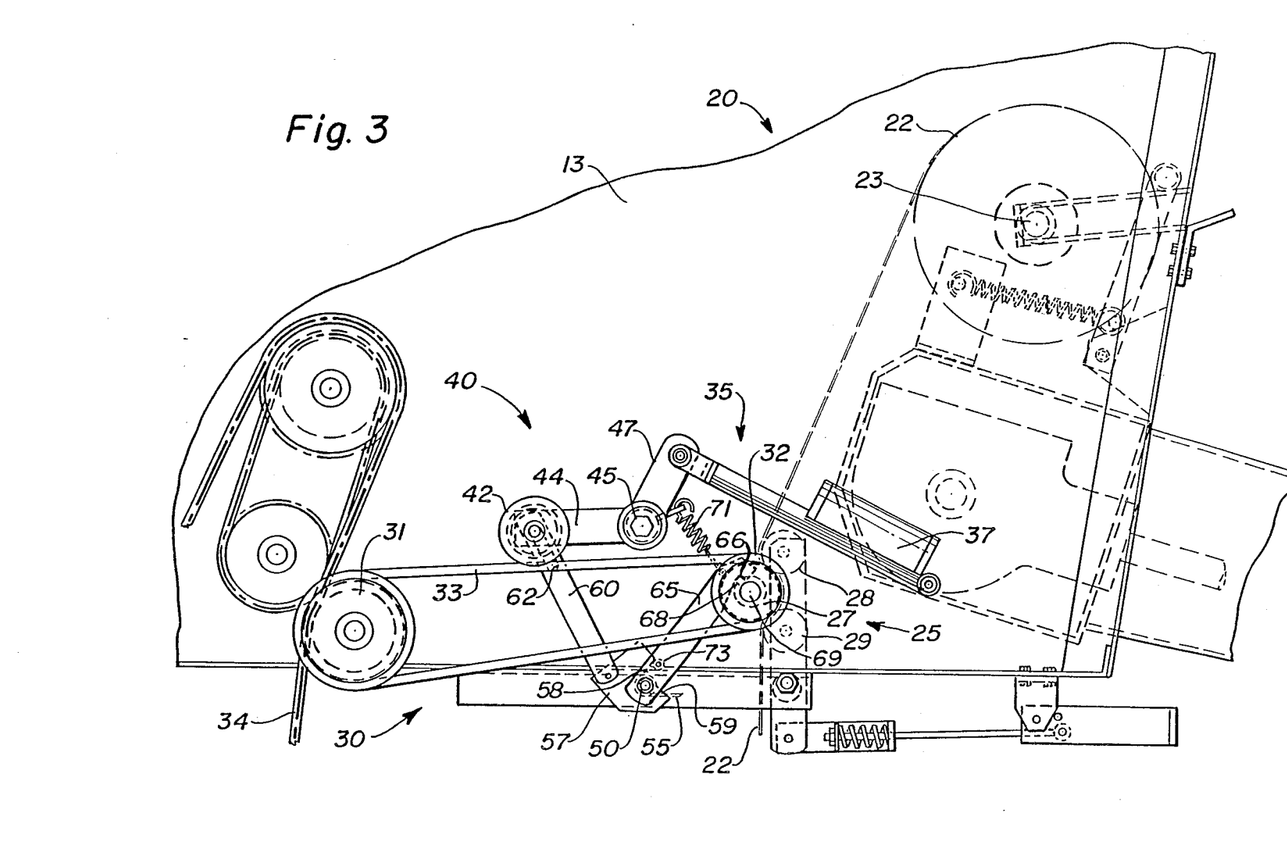
FIG. 3 is an enlarged detail view of the drive mechanism for the net dispensing apparatus corresponding lines 3—3 of FIG. 2.

Referring now to the drawings and, particularly, to FIGS. 1 and 2, side and front elevational views of a round baler incorporating the principles of the instant invention can be seen. Any left and right references are used as a matter of convenience and are determined by standing at the rear of the machine facing the forward end, the direction of travel. The round baler 10 is provided with a wheeled frame 12 and is adapted for movement over the ground G. The frame 12 supports a pair of generally vertical, transversely spaced apart side sheets 13 between which a chain and slat apron 14 is rotatably driven to form the bale forming mechanism 15 within which the cylindrical bale of crop material is formed. A pickup 17 positioned adjacent the ground G delivers crop material from the ground G into the bale forming mechanism 15 in a conventional manner. A drive train 18 provides operational power to all the operable components within the round baler 10. This round baler 10, as described above, is of generally conventional construction and operation and is described in greater detail in a number of U.S. patents, such as U.S. Pat. No. 4,426,833, the descriptive portions of which are incorporated herein by reference.

The round baler 10, however, has been modified to be equipped with a net dispensing apparatus 20. A roll of netting material 22 is mounted on a spindle 23 and rotatably journalled between opposing side sheets 13 at a forward position of the round baler 10. The netting material 22 is threaded downwardly from the roll to a feeding mechanism 25 in the form of a feed roller 27 and first and second pinch rollers 28, 29. The net dispensing apparatus 20 also includes a pivoted knife assembly 31 used to sever the netting material 22 after a sufficient amount has been applied to the outer surface of the cylindrical bale, a drive mechanism 30 for operably powering the feed roll 27, and an actuating mechanism 35 for selectively engaging the drive mechanism 30 to affect a feeding of the netting material 22 into the bale forming mechanism 15. A more detailed description of the mounting of the feeding mechanism 25, namely, the feed roller 27 and the pinch rollers 28, 29, can be found in co-pending U.S. patent application Ser. 045,946 entitled "Feed Rollers for Round Bale Net Dispenser", filed concurrently herewith, the descriptive portions of the structure and operation thereof being incorporated herein by reference.

Referring now to FIGS. 3-7, the structure and operation of the drive mechanism 30 and actuating mechanism 35 can best be seen. The drive mechanism 30 includes a drive belt 33 entrained around a drive pulley 31 and a driven pulley 32 affixed to the feed roller 27. The drive pulley 31 is constantly driven from the drive assembly 34 forming a part of the main drive train 18. Because of the lack of tension in the drive belt 33, no driving power is transferred to the driven pulley 32 and the feed roller 27 is not rotated.

A tensioning mechanism 40 positioned for engagement with the drive belt 33 includes a tensioning pulley 42 rotatably mounted on a pivot arm 44 which is pivotally movable about the pivot 45 affixed to the side sheet 13 of the round baler 10. A lever arm 47 is connected to the actuating mechanism 35 in the form of an electrically driven actuator 37 to effect pivotal movement of the tensioning mechanism 40. As shown with particular reference to FIGS. 3, 4 and 5, the actuator 37 is operable to move the tensioning pulley 42 from a declutch position shown in FIG. 3 into a drive position shown in FIG. 5. This drive position induces tension into the drive belt 33 and affects a transfer of rotational power from the drive pulley 31 to the driven pulley 32 to affect the rotation of the feed roller 27.

Referring now to FIGS. 3-8, it can be seen that the knife assembly 50 includes a knife holder 52 affixed to a pivot shaft 53 and carrying a detachable cutting knife 55 by means of bolts 54. The knife holder has a curved portin 56 wrapped concentrically around the pivot shaft 53. Also, attached to the pivot shaft 53 for rotation with the knife assembly 50 is an actuation member 57, which is of a shape to incorporate a first engagement surface 58 and a second engagement surface 59, the purpose of which will be described in greater detail below.

Figure 4:
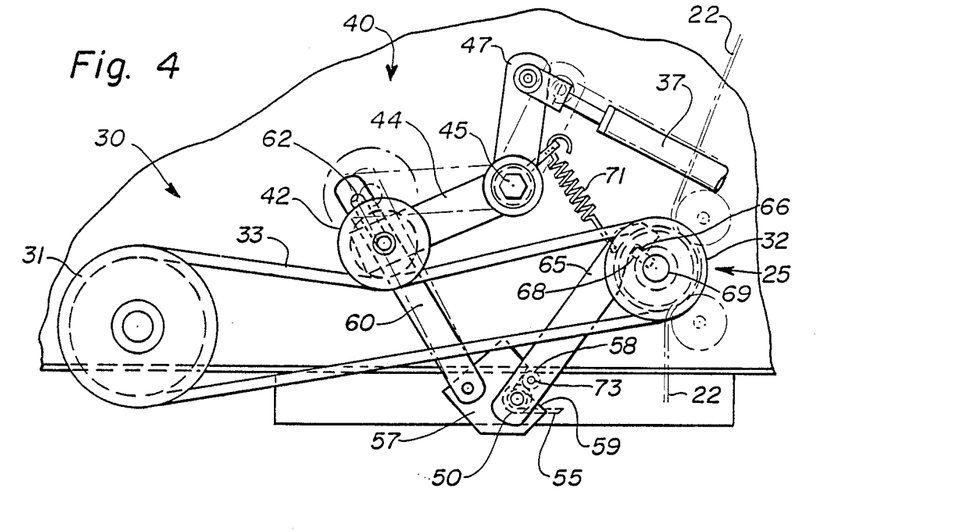
FIG. 4 is an enlarged detail view similar to that of FIG. 3, showing the movement of the tensioning pulley from a declutch position shown in phantom into engagement with the drive belt.
Figure 5:
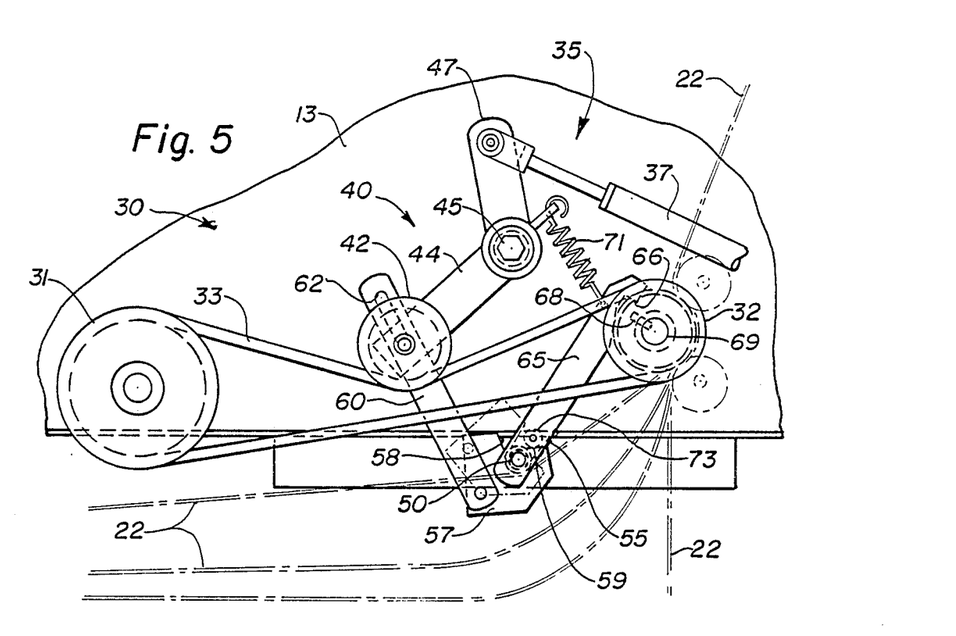
FIG. 5 is an enlarged detail view similar to that of FIG. 4 showing the tensionning pulley fully engaged with the drive belt, the movement of the actuation member fixed to the knife pivot shaft being shown in phantom, the movement of the netting material into the bale forming mechanism being sequentially shown in broken lines.

A connecting link 60 interconnects the tensioning mechanism 40 and the actuation member 57 to transfer synchronized motion from the tensioning mechanism 40 to the actuation member 57 and attached knife assembly 50. The connecting link 60 is formed with a slotted opening 62 through which the tensioning pulley 42 is mounted to the pivot arm 44. The slotted opening 62 serves as a lost motion device and permits the tensioning pulley 42 to move into or out of engagement with the drive belt 33 to a limited extent without affecting movement of the knife assembly 50. As best seen in FIG. 4, the actuator 37 pivotally moves the tensioning pulley 42 into engagement with the drive belt 33 and, as a result, the tensioning pulley 42 moves from the top of the slotted opening 62 to the bottom of the slotted opening 62 without affecting movement of the actuation member 57. Subsequent movement of the tensioning mechanism 40 is depicted in FIG. 5 and causes full engagement of the drive belt 33 by the tensioning pulley 42 and assures a retraction of the knife assembly out of its cutting position.

Figures 6, 8:
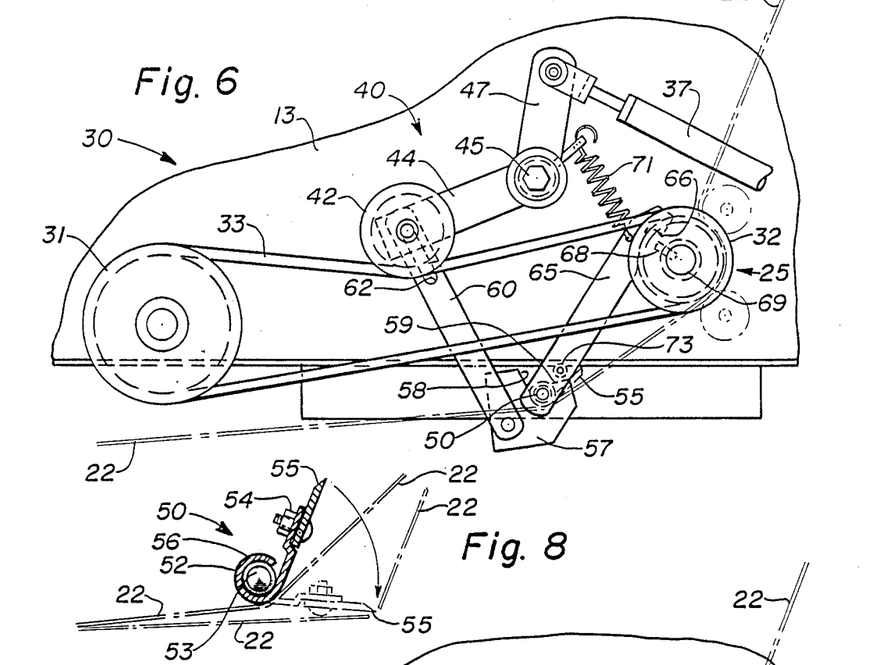
FIG. 6 is an enlarged detail view similar to that of FIG. 5 but showing the tensioning pulley being moved from its drive position toward the declutch position.
FIG. 8 is a cross-sectional view through the knife assembly corresponding to lines 8—8 of FIG. 2, the movement of the cutting knife into its cutting position to sever the netting material being shown in phantom, the movement of the netting materal being sequentially shown in broken lines.
Figure 7:
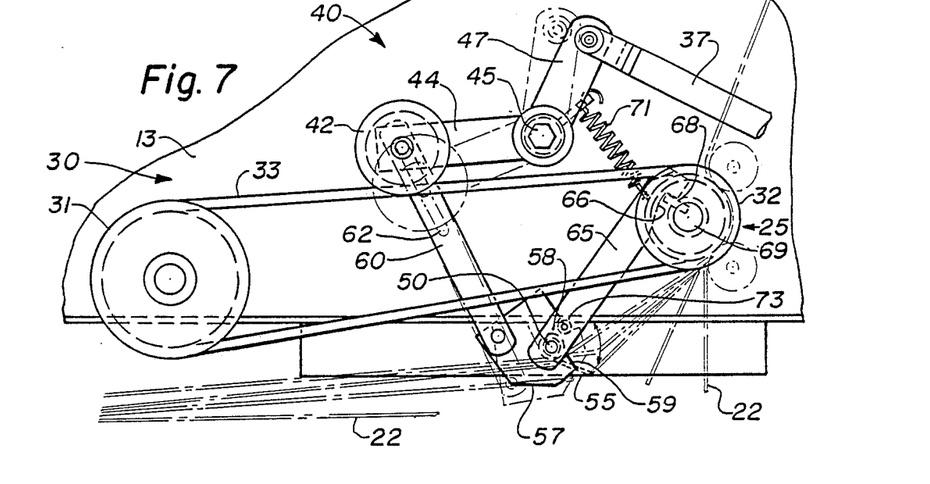
FIG. 7 is an enlarged detail view similar to that of FIG. 6 but showing a further movement of the tensioning pulley to pivotally rotate the cutting knife into its cutting position and the locking arm into engagement with the feed roller to affect a severing of the netting material.

This retracted position of the knife assembly 50 is best shown in FIG. 8 where it can be seen that the netting material 22 rides on the curved portion 56 of the knife holder 52 while being fed into the bale forming mechanism 15 and while out of engagement with the cutting knife 55. After sufficient netting material has been applied to the cylindrical bale, the actuator 37 retracts the tensioning mechanism 40 so that the tensioning pulley 42 relieves the tension on the drive belt 33 to terminate the transfer of rotational power to the driven pulley 32. The tensioning pulley 42 has now moved to the top of the slotted opening 62 in the connecting link 60 with no motion being induced into the knife assembly 52. Subsequent motion of the tensioning mechanism 40 to a fully declutch position, as best seen in FIG. 7, induces a rotation of the actuation member 57 and attached knife assembly 50 to move the cutting knife 55 into a cutting position, as best seen in FIGS. 7 and 8, to affect a severing of the netting material 22, as demonstrated in FIG. 8.

The drive mechanism 30 is also provided with a lockout arm 65 pivotally mounted on the pivot shaft 53 of the knife assembly 50, but movable independently thereof. The lockout arm 65 includes a notch 66 for positionable for engagement with a key 68 fixed to the shaft 69 of the feed roller 27. When the lockout arm 65 is engaged with the key 68, the feed roller 27 is prevented from further rotation. The lockout arm 65 is biased away from the feed roller 27 by a spring 71. The lockout arm 65 is also provided with an outwardly extending pin 73 located proximate to the actuation member 57 for engagement with the first and second engagement surfaces 58, 59. As can be seen with reference to FIGS. 3–7, a rotation of the actuation member to engage the first engagement surface with the pin 73 forces to lockout arm 65 into engagement with the key 68 on the shaft 69. The second engagement surface 59 is provided on the actuation member 57 to assure that the lockout arm 65 becomes disengaged from the feed roll shaft 69 in case the spring 71 is incapable of urging the lockout arms 65 away from the shaft 69 when the tensioning pulley 42 is moved into a drive position, as demonstrated in FIG. 5. Accordingly, when the tensioning pulley 42 is fully engaged with the drive belt 33, the shaft 69 is freed from the lockout arm 65 and is permitted to rotate and thereby feed the netting material 22 into the bale forming mechanism 15.

To summarize the operation of the drive mechanism 30, during the bale formation process of the round baler 10, the net dispensing apparatus 20 remains inactive even though the drive pulley 31 is continuously rotated by the drive assembly 34. Once the cylindrical bale has reached the desired size, the net dispensing apparatus 20 is selectively actuated by engaging the electric actuator 37 to pivotally move the tensioning pulley 42 into engagement with the drive belt 33. Movement of the tensioning pulley 42 into its full driving position, as shown in FIG. 5, causes a synchronized movement of the actuation member 57 and attached knife assembly 50 to retract the cutting knife 55 out of the path of the netting material 22 as shown in FIG. 8. The movement of the actuation member 57 can also cause engagement of the second engagement surface 59 with the pin 73 on the lockout arm 65 to ensure that the lockout arm 65 has disengaged from the key 68 on the feed roller shaft 69 to permit the feed roller 27 to rotate.

The rotation of the feed roller 27 causes a supply of netting material 22 to enter into the bale forming mechanism 15 wherein it is wrapped around the exterior surface of the cylindrical bale. Once a sufficient amount of netting material 22 has been applied to the cylindrical bale, the electrical actuator 37 is reversed and the tensioning pulley 42 is moved toward the declutch position, relieving the tension in the drive belt 33 and terminating the driving of the feed roller 27. Movement of the feed roller 27 into its fully declutched position also affects a synchronized movement of the actuation member 57 to rotate the cutting knife into the path of the netting material 22 and to cause an engagement of the first engagement surface 58 with the pin 73 of the lockout arm 65 thereby forcing the lockout arm 65 into engagement with the key 68 of the feed roller shaft 69 and preventing rotation of the feed roller 27.

Since the source of supply of netting material 22 into the bale forming mechanism 15 has been halted and since the cylindrical bale continues to be rotated by the bale forming mechanism 15, tension is induced into the netting material between the cylindrical bale and the feed roller 27. Hence, the mere rotation of the cutting knife 55 into the path of the netting material 22 is sufficient of cause a parting of the netting material and thereby halt the net dispensing procedure. By rotating the knife assembly 50 radially with respect to the pivot axis 53, instead of tangentially as taught by the Claas prior art mechanism, the knife assembly 50 does not impart significant impact energy into the netting material 22 to effect severing. As best seen in FIG. 8, the netting material 22 rises over the curved portion 56 of the knife holder 52 while being fed into the bale forming mechanism 15. Once the knife member 55 has rotated about the pivot shaft 53 and into the netting material 22, the netting material 22 forms an angle around the cutting edge of the knife member 55 with the netting material 22 extending generally parallel to the knife member 55 as it is being severed.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention, however, concepts, as based upon the description may be employed in other embodiments without departing from the scope of the invention. Accordingly, the following claims are intended to protect the invention broadly, as well as in the specific form.

Having thus described the invention, what is claimed is:

1. In a net dispensing apparatus for use on a round baler to dispense netting material into the bale forming mechanism of the round baler where the cylindrical bale formed therein can be wrapped with a layer of said netting material, said net dispensing apparatus having means for retaining a source of supply of said netting material; a feeding mechanism to feed said netting material from said source of supply to said bale forming means; a knife assembly to sever said netting material after a sufficient amount of said netting material has been fed into said bale forming means; and drive means for operably powering said feeding mechanism, an improved knife assembly comprising:

said knife assembly having a pivot means and a cutting edge rotatably movable about a pivot axis between a retracted position and a cutting position, said netting material engaging the pivot means for said knive assembly while being fed from said feeding mechanism to said bale forming mechanism and while said cutting edge is in a retracted position, said netting material remaining in engagement with said knife assembly while said knife assembly is moved from said retracted position to said cutting position, said cutting edge being selectively movable into said netting material without substantially imparting energy into said netting material such that said netting material forms an angle around said cutting edge, whereby a tensile force exerted on said netting material substantially perpendicular to said cutting edge is solely operable to effect a severing of said netting material along said cutting edge.

2. The net dispensing apparatus of claim 1 wherein said knife assembly includes a knife holder having a curved portion concentric with said pivot axis and a detachable knife member having said cutting edge.

3. The net dispensing apparatus of claim 2 wherein said netting material engages said knife holder while being fed from said feeding mechanism to said bale forming mechanism before said cutting edge is moved into said cutting position.

4. The net dispensing apparatus of claim 3 wherein said netting material extends generally parallel to said knife member when said cutting edge is moved into said cutting position as said netting material is being severed.

5. The net dispensing apparatus of claim 2 wherein said knife member is rotated generally radially of said pivot axis when moving between said retracted position and said cutting position.

* * * * *